United States Patent
Cheng

(10) Patent No.: US 9,099,255 B2
(45) Date of Patent: Aug. 4, 2015

(54) HOUSING HAVING ACTIVATED STRUCTURE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Po-Yu Cheng, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 178 days.

(21) Appl. No.: 13/910,659

(22) Filed: Jun. 5, 2013

(65) Prior Publication Data

US 2014/0110233 A1 Apr. 24, 2014

(30) Foreign Application Priority Data

Oct. 18, 2012 (CN) .......................... 2012 1 0395368

(51) Int. Cl.
*H01H 9/20* (2006.01)
*G06F 1/18* (2006.01)
(52) U.S. Cl.
CPC . *H01H 9/20* (2013.01); *G06F 1/181* (2013.01)

(58) Field of Classification Search
CPC . H01H 2025/004; H01H 25/006; H01H 9/20; G06F 1/18; G06F 1/181
USPC ......... 200/321–325, 329–331, 463, 318, 335, 200/50.12, 50.02
See application file for complete search history.

(56) References Cited

U.S. PATENT DOCUMENTS

| | | | | |
|---|---|---|---|---|
| 3,377,451 A | * | 4/1968 | Kreuter | 200/308 |
| 5,495,082 A | * | 2/1996 | Zaffetti et al. | 200/400 |
| 8,232,488 B2 | * | 7/2012 | Haendler et al. | 200/50.12 |

* cited by examiner

*Primary Examiner* — Edwin A. Leon
(74) *Attorney, Agent, or Firm* — Li & Cai Intellectual Property (USA) Office

(57) ABSTRACT

A housing having activated structure by remotely activates an embedded switch. The case includes a front panel having an inner and outer surface, an operation button, a first elastic member, a latch member having a lead-in portion at one end and an activating portion at the other end, and a lever. The operation button is arranged on the outer face and contacts the lead-in portion. The lever pivotally connects the front panel and selectively contacts the latch member and the switch. When the operation button is pressed, the first elastic member is compressed and the lead-in portion shifts accordingly. The activating portion further applies a force to the lever which then tilts toward the switch, allowing activation. When the first elastic member decompresses, a force applies to the latch member and the latch member returns to the original position.

17 Claims, 5 Drawing Sheets

HOUSING HAVING ACTIVATED STRUCTURE

BACKGROUND

1. Field of the Invention

The invention relates to a housing; in particular to an housing having a latch member structure facilitating layout reconfiguration.

2. Description of Related Art

As technology advances, consumers are more demanding toward the product functionality and user interface as well. The user interface has to satisfy a great variety of conditions and be aesthetic at the same time.

A piece of electronic device contains a plurality of electronic elements. Take a desktop personal computer for example; an optical disk drive, a plurality of ports and a power switch are all retained therein. The user interface (i.e. buttons and ports) is typically a corresponding layout of the exact positions of the associated elements.

The conventional front panel of a personal computer case therefore has relatively limited variation due to the position restriction of the elements. However, the user interface directly affects the using experience, and the product appearance is also a determine issue in the ever-competitive market.

To address the above issues, the inventor strives via associated experience and research to present the instant disclosure, which can effectively improve the limitation described above.

SUMMARY OF THE INVENTION

The object of the instant disclosure is to provide a housing which allows diverse layouts of corresponding elements.

According to one exemplary embodiment of the instant disclosure, the housing comprises a front panel, a latch member member, an operation button and a lever. The front panel has an outer surface and an inner surface which orientates toward a device. The latch member is movably disposed on the inner surface of the front panel. Moreover, one end of the latch member ends with a lead-in portion while the other ends with an activating portion. The operation button is disposed on the outer surface of the front panel and corresponding to the lead-in portion of the latch member member. The lever pivotally connects the front panel from one end, whereas the other end thereof swings between the activating portion of the latch member and a switch. When the operation button is pressed, the latch member shifts accordingly and the activating portion exerts against the lever. Then the lever slightly spins to trigger the switch.

The instant disclosure provides the following benefits: by a user pressing the aforementioned operation button to push one end of the latch member, the other end of the latch member exerts against the lever for initialize the switch. In this way, the instant disclosure can change the operation buttons of the front panel and being away from the switch. The operation button can be arranged at any desired position and the appearance of the operation button can be changed as well.

In order to further understand the instant disclosure, the following embodiments are provided along with illustrations to facilitate the appreciation of the instant disclosure; however, the appended drawings are merely provided for reference and illustration, without any intention to be used for limiting the scope of the invention.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
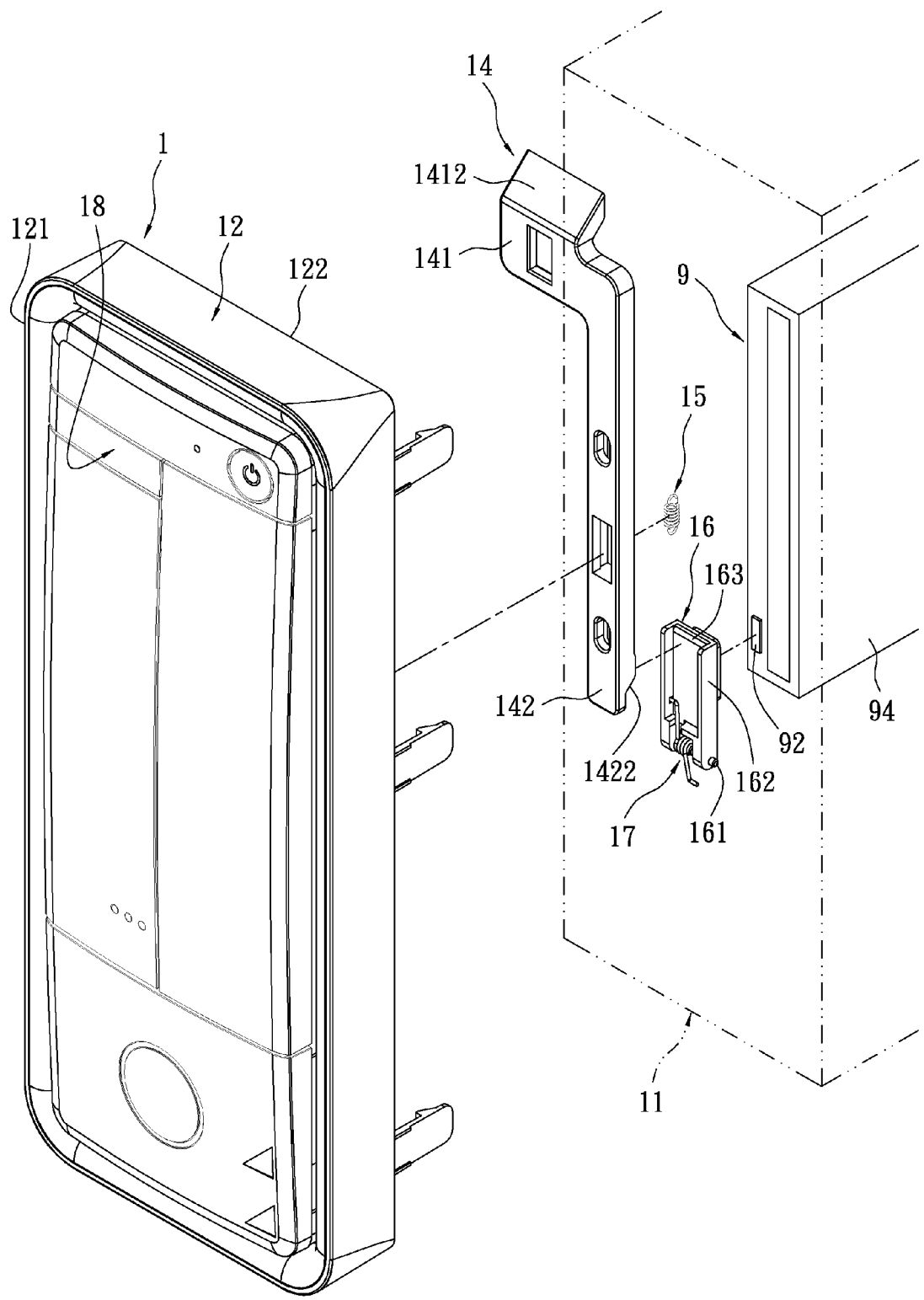
FIG. 1 illustrates an exploded diagram of a housing allowing layout reconfiguration in accordance with an embodiment of the instant disclosure.

FIG. 1 is an exploded view of a housing having activated structure. Referring to FIG. 1, the activated structure enables triggering of a remote switch 92 of a device 9. In the instant embodiment, a desktop personal computer is taken as an example and the housing 1 represents the computer housing thereof. The device 9 represents an optical disk drive and the switch 92 is the button allowing for opening a disk try 94. However, the instant disclosure can be adapted to any device with an outer case acting as a user interface.

The housing 1 comprises a housing body 11 and a front panel 12 disposed at the front of the housing body 11. The device 9 is installed in the housing body 11 and concealed behind the front panel 12. The front panel 12 has an inner surface 122, which orientates toward the device 9 and an outer surface 121 opposing thereto. The housing 1 also comprises a latch member 14, which is movably disposed on the inner surface 122 of the front panel 12, a lever 16 pivotally connecting the inner surface 122 and an operation button 18 disposed on the outer surface 121.

Figure 2:
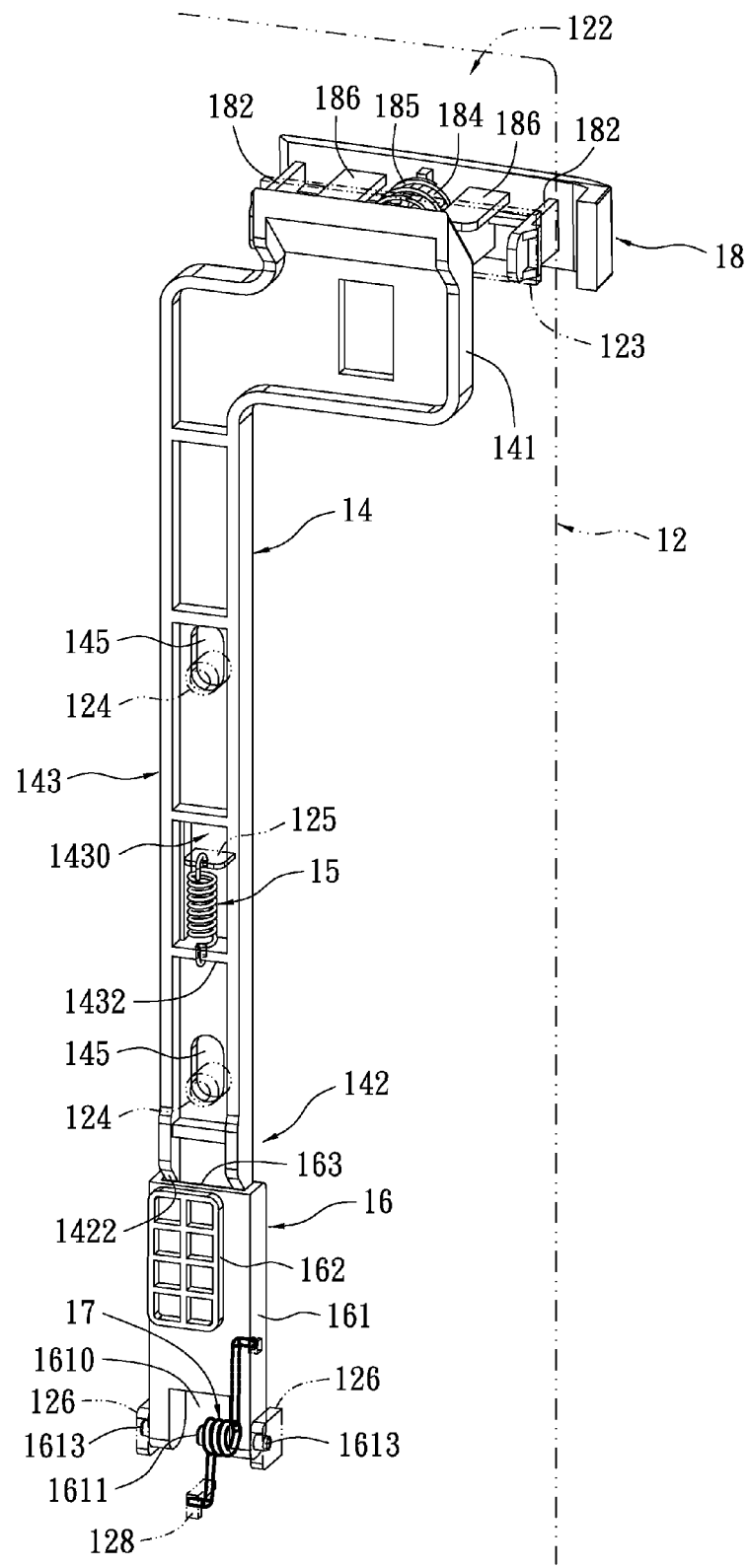
FIG. 2 illustrates a perspective view of a housing allowing layout reconfiguration in accordance with an embodiment of the instant disclosure.

FIGS. 1 and 2 show a perspective view of the housing 1. Only the latch member 14 and the lever 16 are shown in FIG. 2 and the remaining members are omitted for clarity. The latch member 14, which ends with a lead-in portion 141 at one end and an activating portion 142 at the other end, is slidably disposed on the inner surface 122. As shown in FIG. 2, the lead-in portion 141 is formed with a lead-in ramp 1412 orientating toward the operation button 18. The activating portion 142 is formed with an activating ramp 1422 aligning the lever 16. The latch member 14 resembles a strip and the protruded lead-in portion 141 connects to the activating portion 142 via an extending portion 143. The length of the extending portion 143 is adjustable according to the distance between the operation button 18 and the switch 92. The extending portion 143 also connects the inner surface 122 of the front panel 12 in a mobile manner.

In the instant embodiment, the latch member 14 moves substantially linearly. The extending portion 143 is formed with a pair of guiding holes 145 to receive a pair of guiding post 124 from the front panel 12 respectively. In addition, a plurality of positioning plates 146 stretches out from the front panel 12, and retaining hooks on either side of the extending portion 143 retain the position thereof. However, the instant disclosure is not limited thereto. For example, the positioning plates 146 can be omitted and the latch member 14 is secured on the inner surface 122 by screws, which passes through the guiding holes 145 and selectively contacts the guiding posts 124. Alternatively, the latch member 14 may be fastened onto the inner surface 12 in a rotatable manner. More specifically, the extending portion 143 pivotally connects the inner surface 122 acting as a hinge and the lead-in portion 141 and activating portion 142 swing accordingly.

With reference to FIG. 2 the instant embodiment also comprises a first elastic member 15, which returns the latch member 14 back to an original position (i.e. before the operation button 18 is pressed). The first elastic member 15 can be a latch member spring accommodated in a receiving hole 1430 of the extending portion 143. The placement of the latch member spring may vary. For example, one end of the latch member spring can be attached on a fixed tab 1432 of the extending portion 143 and the other end thereof is fastened onto the inner surface 12 of the front panel 12. Additionally, as shown in FIG. 2, the latch member spring is attached on the extending portion 143, and a fixed plate 125 stretching out from the inner surface 122 retains the other end thereof.

Please refer to FIG. 1. The lever 16 facilitates the latch member 14 to trigger the switch 92. One end of the lever 16 pivotally connects to the front panel 12 while the other end thereof swings between the activating portion 142 of the latch member 14 and switch 92. As shown in FIG. 1, the lever 16 is pivotally connected to the inner surface 122 of the front panel 12 via a pivot portion 161. A triggering portion 162 extends from the pivoting portion 161 and selectively contacts the activating portion 142 and switch 92. Please refer to FIG. 3. The triggering portion 162 abuts the activating portion 142 which is at proximate to the switch 92 of the device 9.

As shown in FIG. 1, a smooth surface 163 is formed on the lever 16 to ensure effortless movement over the activating ramp 1422. Moreover, a third elastic member 17 is disposed at one end of the lever 16 to facilitate the return of the lever 16 after forcibly tilted.

Please refer to FIG. 2 showing the detail of the engagement between the lever 16 and the front panel 12. Specifically, the pivoting portion 161 has a pair of pivot pins 1613 projecting from either end thereof. The inner surface 122 of the front panel 12 has a pair of pivot plates 126 conforming to the pivot pins 1631 and connecting thereto. Additionally, the pivoting portion 161 is formed with a recessed portion 1610, and a spring holder 1611 extends laterally across the recessed portion 1610. The third elastic member 17 may be a torsion spring looping the spring holder 1611. Furthermore, the third elastic member 17 is fastened by lever 16 and front panel 12 from either end. In the instant embodiment, one end of the torsion spring is inserted into the lever 16 whereas the other end thereof attaches to a retaining hook 128 extending from the inner surface 122. In addition, the lever 16 may be integrally formed with the third elastic member 17, which abuts the inner surface 122.

Please refer to FIGS. 1 and 2. The operation button 18 is arranged on the outer surface 121 of the front panel 12 and initializing a series of motions. More specifically, as shown in FIG. 2, the operation button 18 stretches out from the front panel 12 and contacts the lead-in portion 141 of the latch member 14. When the operation button 18 is pressed, the latch member 14 also shifts accordingly. The activating portion 142 further presses the triggering portion 162 which then spins slightly by using the pivoting portion 161 as a hinge. The triggering portion 162 finally contacts and activates the switch 92 of the device 9.

Figure 2A:
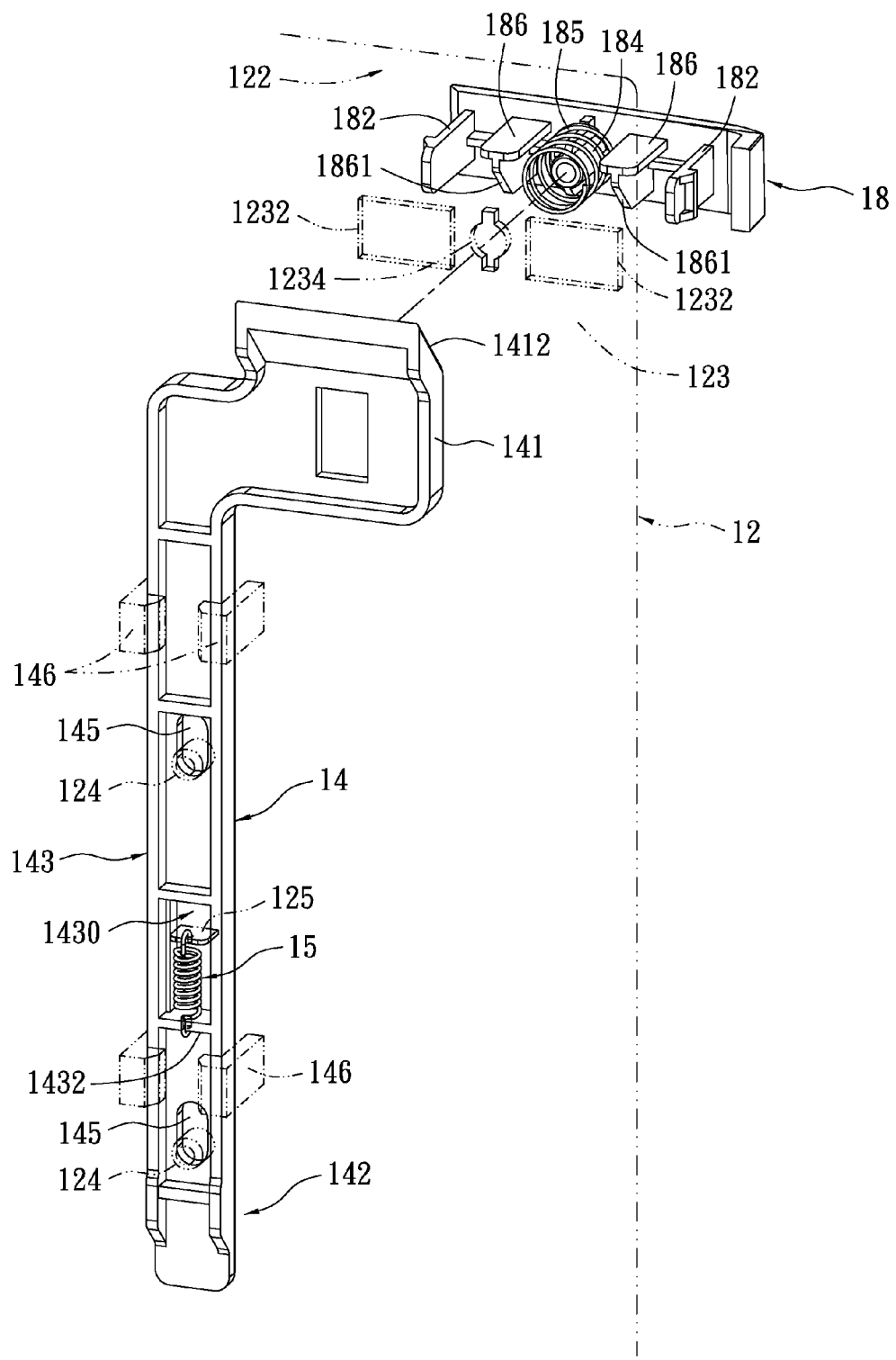
FIG. 2A illustrates a perspective view of an operation button assembled in a front panel in accordance with an embodiment of the instant disclosure.

Please refer to FIG. 2A showing a perspective view of the operation button 18 assembled with the front panel 12. The operation button 18 has a pair of retaining tabs 182, an assembly post 184 disposed between the retaining tabs 182, a second elastic member 185 looping the assembly post 184 and a pair of pushing tabs 186 disposed on either side of the assembly post 184. The retaining tabs 182 movably engage with the front panel 12 for minimizing the shift of the operation button 18. For instance, the front panel 12 has a connection part 123 (shown in dotted line) aligning parallel to the inner surface 122. The tips of the retaining tabs 182 resemble retaining hooks which grip a side hole 1232 on the connection part 123. The number of the retaining tabs 182 may be at least one. The second elastic member 185 facilitates the return of the operation button 18 to an original position (i.e. before pressed). In the instant embodiment, the second elastic member 185 is a compression spring enclosing the assembly post 184 and disposed between the connection part 123 and a back of the operation button 18. The connection part 123 is also formed with a through hole 1234 to allow penetration of the assembly post 184. The pushing tabs 186 are formed with pushing ramps 1861, which pass through the side hole 1232 and presses against the lead-in ramp 1412.

Figure 3:
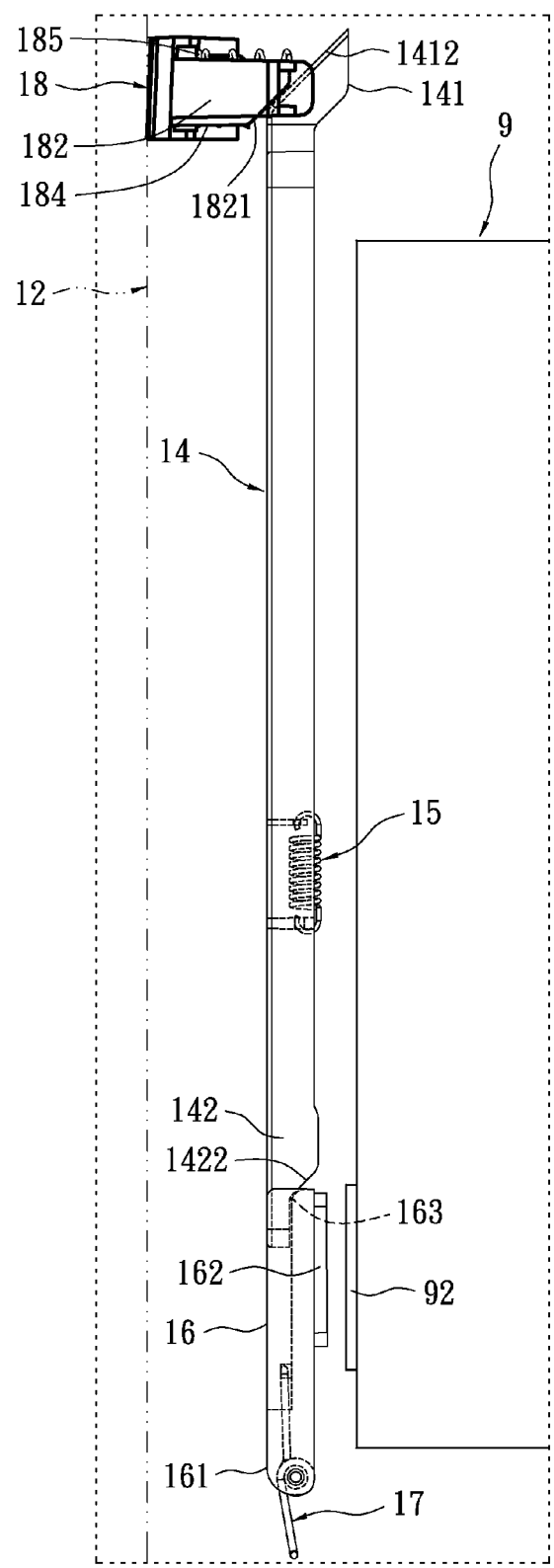
FIG. 3 illustrates a side view of a housing allowing layout reconfiguration before triggered in accordance with an embodiment of the instant disclosure.
Figure 4:
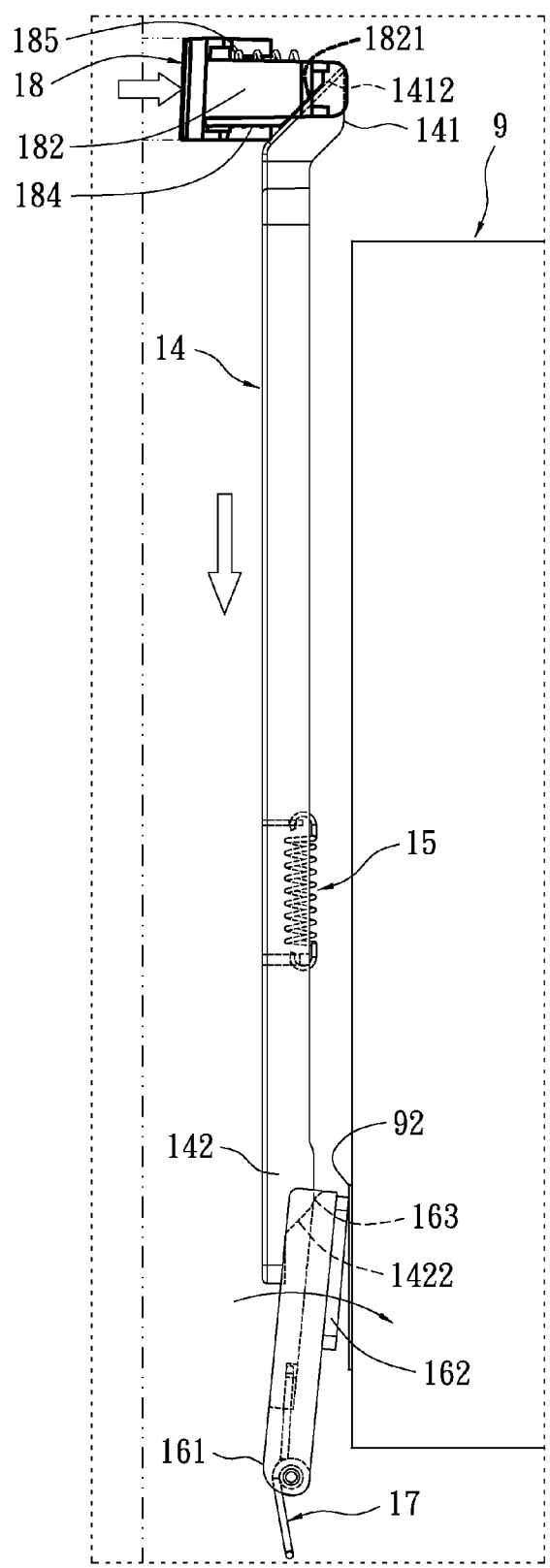
FIG. 4 illustrates a side view of a housing allowing layout reconfiguration after triggered in accordance with an embodiment of the instant disclosure.

Please refer to FIG. 3 in conjunction with FIG. 4 showing a serial movement of the housing 1. As shown in FIG. 3, the operation button 18 is remote from the switch 92 of the device 9. When a user presses the operation button 18, the pushing ramps 1861 abut the lead-in ramp 1412 and provide a force driving the latch member 14. As shown in FIG. 3, while the latch member 14 shifts downward, the activating portion 142 travels further down and abuts the smooth surface 163. The lever 16 tilts toward the device 9 by the force from the latch member 14. In FIG. 3, the lever 16 spins clock-wise and the triggering portion 162 activates the switch 92 to open the disk tray 94.

In summary, the latch member 14 communicates between the operation button 18 and switch 92 so the front panel 12 is available for button layout reconfiguration. The user interface of an electronic device has more freedom in design because the arrangement of buttons or ports no longer needs to be an exact map of the corresponding member. In other words, the latch member 14 provides a trigger system which presents the operation button 18 as a virtual position of the actual switch 92. Hence the user interface can be reconfigured instead of confined by the interior layout.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A housing having activated structure, comprising:
   a front panel having an outer surface and an inner surface;
   a latch member movably disposed on the inner surface, the latch member ending with a lead-in portion at one end and a activating portion at the other end;
   a first elastic member for exerting against the shifted latch member to an original position;
   an operation button arranged on the outer surface and corresponding to the lead-in portion to lead the latch member shifting when pressed;
   a second elastic member recovering the operation button after pressed; and
   a lever coupling with the activating portion and a switch at one end and pivotally connecting the front panel at the other end;
   wherein when the operation button is pressed, the latch member shifts accordingly and the activating portion abuts the lever which then activates the switch.

2. The housing having activated structure according to claim 1, wherein the operation button has an assembly post extended from a back thereof, and the second elastic member is a compress spring enclosed the assembly post.

3. The housing having activated structure according to claim 2, wherein the operation button has at least one retaining tab extended from a back thereof and the retaining tab is movably engaged with the front panel to confine the movement of the operation button.

4. The housing having activated structure according to claim 1, wherein the lever has a pivoting portion formed at one end thereof to pivotally connect the front panel and a triggering portion at the other end thereof to selectively contacts the activating portion and the switch.

5. The housing having activated structure according to claim 4, further comprising a third elastic member returning the lever after forcibly tilted.

6. The housing having activated structure according to claim 5, wherein the pivoting portion is further formed with a receiving space toward the lever, and a spring holder formed laterally across the receiving space, and the third elastic member is a torsion spring enclosed the spring holder, wherein the torsion spring has one end fastened to the lever and the other end fixed to the front panel.

7. The housing having activated structure according to claim 1, wherein the latch member further including an extending portion joining the lead-in portion and the activating portion and movably connecting the inner surface of the front panel.

8. The housing having activated structure according to claim 7, wherein the first elastic member is a coil spring having one end fastened to the extending portion and the other end fixed to the inner surface of the front panel.

9. The housing having activated structure according to claim 1, wherein the lead-in portion of the latch member has a lead-in ramp corresponding to and faced to the operation button.

10. The housing having activated structure according to claim 1, wherein the activating portion of the latch member has an activating ramp faced the level, and the level has a smooth surface against activating ramp.

11. A housing having activated structure, comprising:
a front panel having an outer surface and an inner surface;
a latch member movably disposed on the inner surface, the latch member ending with a lead-in portion at one end and a activating portion at the other end;
a first elastic member for exerting against the shifted latch member to an original position;
an operation button arranged on the outer surface and corresponding to the lead-in portion to lead the latch member shifting when pressed; and
a lever having a pivoting portion formed at one end thereof to pivotally connect the front panel, and a triggering portion at the other end thereof to selectively contact the activating portion and a switch;
wherein when the operation button is pressed, the latch member shifts accordingly and the activating portion abuts the lever which then activates the switch.

12. The housing having activated structure according to claim 11, further comprising a third elastic member returning the lever after forcibly tilted.

13. The housing having activated structure according to claim 12, wherein the pivoting portion is further formed with a receiving space toward the lever, and a spring holder formed laterally across the receiving space, and the third elastic member is a torsion spring enclosed the spring holder, wherein the torsion spring has one end fastened to the lever and the other end fixed to the front panel.

14. The housing having activated structure according to claim 11, wherein the latch member further including an extending portion joining the lead-in portion and the activating portion and movably connecting the inner surface of the front panel.

15. The housing having activated structure according to claim 14, wherein the first elastic member is a coil spring having one end fastened to the extending portion and the other end fixed to the inner surface of the front panel.

16. The housing having activated structure according to claim 11, wherein the lead-in portion of the latch member has a lead-in ramp corresponding to and faced to the operation button.

17. The housing having activated structure according to claim 11, wherein the activating portion of the latch member has an activating ramp faced the level, and the level has a smooth surface against activating ramp.

* * * * *